(12) United States Patent
Li et al.

(10) Patent No.: US 7,446,877 B2
(45) Date of Patent: Nov. 4, 2008

(54) ALL-FIBER SPECTROSCOPIC OPTICAL SENSOR

(75) Inventors: Qun Li, Newark, DE (US); Sean Xiaolu Wang, Centerville, DE (US)

(73) Assignee: BWT Property Inc., Newark, DE (US)

( * ) Notice: Subject to any disclaimer, the term of this patent is extended or adjusted under 35 U.S.C. 154(b) by 68 days.

(21) Appl. No.: 11/212,112

(22) Filed: Aug. 26, 2005

(65) Prior Publication Data

US 2007/0279636 A1    Dec. 6, 2007

Related U.S. Application Data

(60) Provisional application No. 60/604,710, filed on Aug. 27, 2004.

(51) Int. Cl.
*G01B 9/02* (2006.01)
*G01J 3/45* (2006.01)
*G01J 3/28* (2006.01)
*G02B 6/34* (2006.01)

(52) U.S. Cl. .................. 356/451; 356/326; 385/37

(58) Field of Classification Search ............ 356/326, 356/328, 317, 318, 417, 301, 477, 479, 451, 356/454, 480; 385/12, 37; 250/459.1, 461.1, 250/461.2
See application file for complete search history.

(56) References Cited

U.S. PATENT DOCUMENTS

| | | | |
|---|---|---|---|
| 4,052,121 A | | 10/1977 | Chang |
| 4,663,961 A | * | 5/1987 | Nelson et al. ............... 73/24.02 |
| 4,771,629 A | * | 9/1988 | Carlson et al. ............. 73/23.35 |
| 4,832,437 A | | 5/1989 | Kim et al. |
| 4,998,017 A | * | 3/1991 | Ryan et al. ................. 250/343 |
| 5,120,961 A | * | 6/1992 | Levin et al. ............ 250/339.07 |
| 5,206,701 A | * | 4/1993 | Taylor et al. ................. 356/325 |
| 5,444,528 A | * | 8/1995 | Puschell ...................... 356/73 |
| 5,475,221 A | * | 12/1995 | Wang .................... 250/339.07 |
| 5,477,321 A | * | 12/1995 | Johnson ..................... 356/319 |
| RE35,355 E | * | 10/1996 | Ryan et al. .................. 250/343 |
| 5,606,413 A | * | 2/1997 | Bellus et al. ................ 356/326 |
| 5,641,956 A | * | 6/1997 | Vengsarkar et al. .......... 385/28 |

(Continued)

FOREIGN PATENT DOCUMENTS

WO    WO 01/90804    11/2001

(Continued)

OTHER PUBLICATIONS

Photonic-Crystal Fiber, Dec. 22, 2006; http://en.wikipedia.org/wiki/Photonic-crystal_fiber.

(Continued)

*Primary Examiner*—Patrick Connolly
(74) *Attorney, Agent, or Firm*—Blank Rome LLP

(57) ABSTRACT

A spectroscopic sensor apparatus based on an all optical fiber platform includes a light source, a sensor head, and a fiber acousto-optic tunable filter (FAOTF) based spectrometer. The target agent to be detected interacts with the optical field through the sensor head and produces an absorption or emission spectrum. The absorption or emission spectrum is then measured by the AOTF spectrometer to analyze the constituent of the target agent.

19 Claims, 6 Drawing Sheets

U.S. PATENT DOCUMENTS

| | | | |
|---|---|---|---|
| 5,946,128 A * | 8/1999 | Paek | 359/305 |
| 5,956,355 A * | 9/1999 | Swanson et al. | 372/20 |
| 6,021,237 A * | 2/2000 | Kim et al. | 385/28 |
| 6,103,535 A * | 8/2000 | Pilevar et al. | 436/518 |
| 6,151,427 A | 11/2000 | Satorius | |
| 6,233,379 B1 | 5/2001 | Kim et al. | |
| 6,253,002 B1 | 6/2001 | Kim et al. | |
| 6,266,462 B1 | 7/2001 | Kim et al. | |
| 6,357,913 B1 | 3/2002 | Kim et al. | |
| 6,532,323 B2 * | 3/2003 | Kim et al. | 385/28 |
| 6,535,665 B1 | 3/2003 | Kim et al. | |
| 6,563,985 B2 * | 5/2003 | Yin et al. | 385/37 |
| 6,647,159 B1 | 11/2003 | Satorius | |
| 6,882,429 B1 * | 4/2005 | Weitekamp et al. | 356/482 |
| 6,904,188 B1 | 6/2005 | Yun et al. | |

FOREIGN PATENT DOCUMENTS

| | | |
|---|---|---|
| WO | WO 01/90805 | 11/2001 |
| WO | WO 01/90806 | 11/2001 |
| WO | WO 01/90807 | 11/2001 |
| WO | WO 01/95022 | 12/2001 |

OTHER PUBLICATIONS

Photonic Crystal Fibre, Dec. 22, 2006; http://www.bath.ac.uk/physics/groups/opto/pcf.html.

Technology Tutorial—Introduction, Dec. 22, 2006; http://www.crystal-fibre.com/technology/technology_tutorial.shtm.

Qun Li et al, "Highly Efficient Acoustooptic Tunable Filter Based on Cladding Etched Single-Mode Fiber," *IEEE Photonics Technology Letters*, vol. 14, No. 3, Mar. 2002, pp. 337-339.

Qun Li et al, "Demonstration of Narrow-Band Acoustooptic Tunable Filters on Dispersion-Enhanced Single-Mode Fibers," *IEEE Photonics Technology Letters*, vol. 14, No. 11, Nov. 2002, pp. 1551-1553.

* cited by examiner

US 7,446,877 B2

ALL-FIBER SPECTROSCOPIC OPTICAL SENSOR

REFERENCE TO RELATED APPLICATION

The present application claims the benefit of U.S. Provisional Application No. 60/604,710, filed Aug. 27, 2004, whose disclosure is hereby incorporated by reference in its entirety into the present disclosure.

FIELD OF THE INVENTION

This invention generally relates to a spectroscopic optical sensor, and more specifically to an all-fiber spectroscopic sensor comprising a fiber acousto-optic tunable filter (FAOTF).

DESCRIPTION OF RELATED ART

Optical spectroscopy is a powerful means for chemical and biological (CB) substance analysis. It can identify as well as determine the concentration of certain CB agents through their characteristic absorption or emission spectra. This is exceptionally useful for some sensor applications where multiple CB agent detection is required, such as real time monitoring of environmental pollution, detection of CB warfare agents, in situ human health status surveillance, bio-medical sensors, etc.

The concept of an FAOTF (fiber acousto-optic tunable filter), as a variation of an AOTF (acousto-optic tunable filter), was developed in the late 1980s as disclosed by B. Y. Kim et al. in the article "All fiber acousto-optic frequency shifter," *Optics Letters,* Vol. 11, p. 389, 1986, and U.S. Pat. No. 4,832, 437, "Fiber optic inter-mode coupling single side band frequency shifter". In this device, an acoustic wave is launched onto a section of bare fiber through piezo electric transducer (PZT) and creates a dynamic grating. The fiber grating works as a narrow band optical filter. The central wavelength and extinction ratio of the filter are determined by the frequency and amplitude of the acoustic wave, respectively, which can be easily tuned through electronic control. The later published patents related to FAOTF include U.S. Pat. Nos. 6,904, 188, 6,647,159, 6,535,665, 6,357,913, 6,253,002, 6,266,462, 6,233,379, 6,151,427, and 6,021,237 and PCT published patent application nos. WO0190807, WO190806, WO0190805, WO0190804, and WO0195022. The target application of these references focuses on optical communication fields; therefore, (i) the operation wavelength of the demonstrated FAOTFs is around 1.5 µm, and no description is provided about how to expand the operation wavelength to beyond the 1.5 µm range; (ii) the FAOTFs are implemented on standard communication fibers, which limits their performance in bandwidth, tuning range, free spectral range (FSR), power consumption, etc.; and (iii) the application of an FAOTF in the spectroscopic sensor field is not discussed or even suggested.

SUMMARY OF THE INVENTION

It is thus the overall goal of the current invention to provide an all-fiber spectroscopic optical sensor apparatus which utilizes an FAOTF as a low-cost spectrometer.

In this invention, a fiber acousto-optic tunable filter (FAOTF) is utilized to build an all-fiber spectroscopic optical sensor that is compact, potentially very low cost as a disposable item and capable for multiple CB agent detection.

At least one embodiment uses specially engineered optical fibers (i) to expand the operation wavelength of the FAOTF so as to meet the requirements for visible (VIS), near infrared (NIR), and/or infrared (IR) spectroscopy; (ii) to reduce the bandwidth of the FAOTF so as to increase its spectral resolution as a spectrometer; (iii) to increase the free spectral range (FSR) of the FAOTF for broadband spectrum analysis; (iv) to enhance the acousto-optic mode coupling efficiency of the FAOTF so as to reduce its power consumption.

In at least one embodiment, a FAOTF spectroscopic sensor is used for CB agent detection. The spectroscopic sensor comprises a light source, a sensor head, and a FAOTF based spectrometer. The target agent to be detected interacts with the optical field through the sensor head and produces an absorption or emission spectrum. The absorption or emission spectrum is then measured by the AOTF spectrometer to analyze the constituent of the target agent.

BRIEF DESCRIPTION OF THE DRAWINGS

Preferred embodiments of the present invention will be set forth in detail with reference to the drawings, in which.

DETAILED DESCRIPTION OF THE PREFERRED EMBODIMENT

Preferred embodiments of the present invention will now be set forth in detail.

Figure 1:
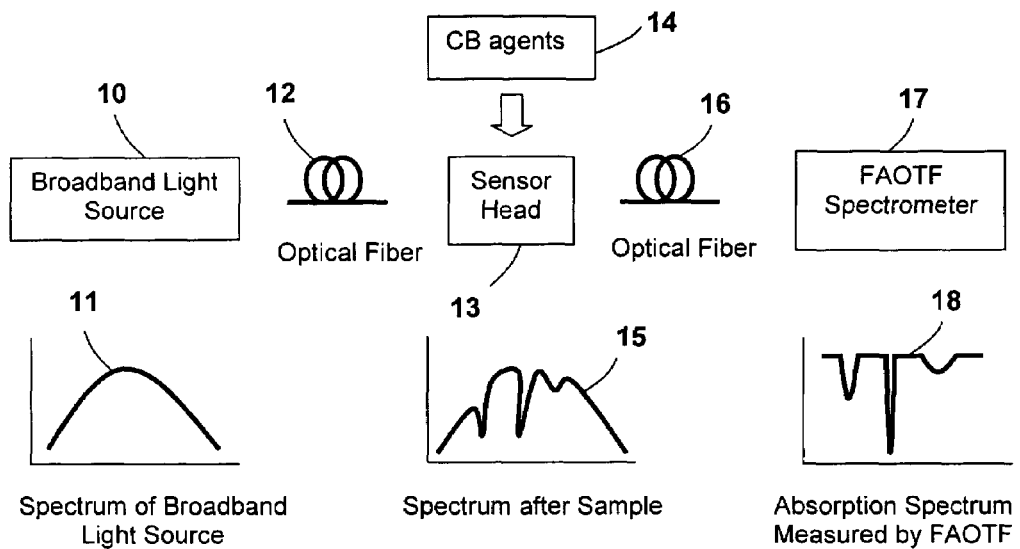
FIG. 1 shows the block diagram of one exemplary embodiment of the all-fiber spectroscopic sensor, in which the absorption spectrum of the sample is measured.

The block diagram of one exemplary embodiment of the current invention is illustrated in FIG. 1, in which the absorption spectra associated with certain CB agents are measured. In this scheme, a broadband light source 10 is first used to produce an optical signal with broadband spectrum 11, which light source can be a light emitting diode (LED), a superluminescence diode (SLD), a supercontinuum light source, or other kinds of broadband light sources. The output signal of the light source 10 is then coupled into an optical fiber 12 and transmitted to an optical sensor head 13. The CB agents 14 interact with the optical field at the sensor head 13 and produce an output spectrum 15, in which certain wavelength components of the optical signal is absorbed by the CB agents 14. The optical signal is then transmitted via an optical fiber 16 to the FAOTF spectrometer 17, which performs a wavelength scan to obtain the absorption spectrum 18 of the CB agent 14.

Figure 2:
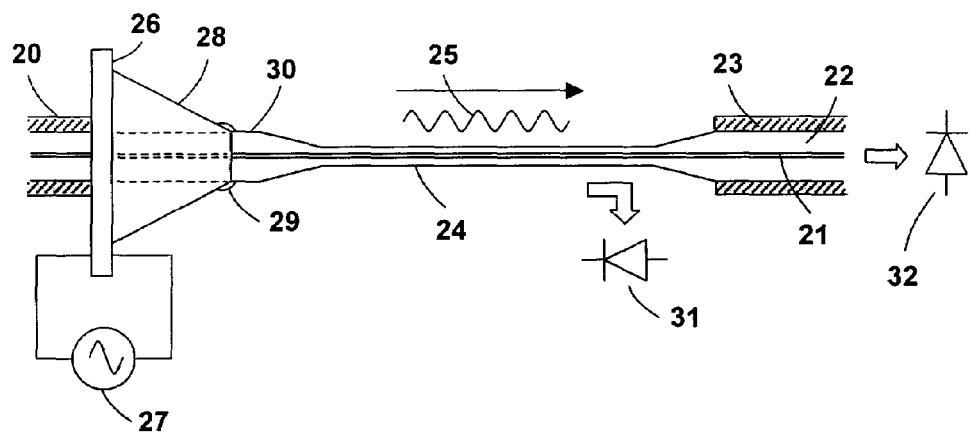
FIG. 2 shows the structure of the FAOTF spectrometer built on high numerical aperture (NA) single-mode fiber.

The structure of the exemplary FAOTF spectrometer is illustrated in FIG. 2. The whole device is implemented on an ultra-high numerical aperture (NA) silica optical fiber 20. The optical fiber 20 is a single mode fiber (SMF) comprising concentric core region 21, cladding region 22, and jacket region 23. The optical signal that propagates in the fiber 20 is confined in the core region 21. The fiber 20 has an NA of 0.28, a cutoff wavelength of about 1000 nm, a core diameter of about 2.7 μm, a cladding diameter of 125 μm, and a jacket diameter of 250 μm. The construction method for the FAOTF is similar to those described in the prior art. A section of the optical fiber 20 is stripped of its jacket and acts as the acousto-optic (AO) interaction media. As opposed to previous approaches, the bare fiber 24 is etched in hydrofluoric acid (HF) to a diameter of 30 μm in order to modify the field distribution and dispersion property of the cladding modes. The length of the etched fiber 24 is about 7 cm. The acoustic wave 25 is generated by a shear mode PZT 26 and an electronic signal generator 27 and coupled into a small section of un-etched bare fiber 30 through a cone structure 28 and adhesive 29. The acoustic wave is further transmitted into the etched fiber region 24 and creates a dynamic grating through a micro-bending effect. The dynamic grating couples the optical signal from core mode into cladding mode at a specific wavelength determined by the acoustic frequency. The cladding mode is finally absorbed by the fiber jacket 23 at the distal end of the fiber 20. The optical power of the cladding mode, which corresponds to the intensity of the optical signal at the AO coupling wavelength, is measured by a photo detector 31. The method of using a photo detector for cladding mode measurement has been discussed by Qun Li et al. in their article "Compact all-fibre on-line power monitor via core-to-cladding mode coupling", Electronics Letters, vol. 38, p. 1013, 2002. The optical intensity at the AO coupling wavelength can also be measured by a photo detector 32 at end of the fiber, which monitors the power variation of the core mode. By scanning the acoustic frequency, the optical intensity of different wavelength components of the input optical signal is obtained. The absorption spectrum of the sample is obtained by comparing the optical spectrum after the sample with the optical spectrum of the light source.

The FAOTF employed in this embodiment is designed to have a large wavelength tuning range of >500 nm (from 1700 nm to 2200 nm), a large FSR of >700 nm, a narrow bandwidth of <5.5 nm, and a small electrical power consumption of <100 mW. All these features make it an ideal candidate for NIR spectroscopy. The wavelength tuning range of the FAOTF is mainly determined by the operation frequency range of the PZT. In the current embodiment, the PZT has an operation frequency range from 600 kHz to 3500 kHz. The optical fiber is etched to modify the acoustic wave propagation property so that the required frequency tuning range of the FAOTF matches with the operation frequency range of the PZT. The fiber etching also increases the modal overlap between core and cladding modes, which in turn enhances the AO mode coupling efficiency and reduces the power consumption of the FAOTF. This effect has been discussed by Qun Li et al. in their article "Highly efficient acoustooptic tunable filter based on cladding etched single-mode fiber", IEEE *Photonics Technology Letters*, Vol. 14, p. 337, 2002. The bandwidth of the FAOTF is mainly determined by the length of the bare fiber and the dispersion property of the core and cladding modes. In the current embodiment, the high NA fiber has a very small core diameter (2.7 μm vs. 8.5 μm for standard communication fiber). This small core diameter significantly increases the waveguide dispersion of the core mode, which results in a narrow filtering bandwidth. The relationship between FAOTF bandwidth and fiber dispersion has been discussed by Qun Li et al. in their article "Demonstration of narrowband acousto-optic tunable filters on dispersion-enhanced single-mode fibers", *IEEE Photonics Technology Letters,* Vol. 14, p. 1551, 2002.

Figure 3:
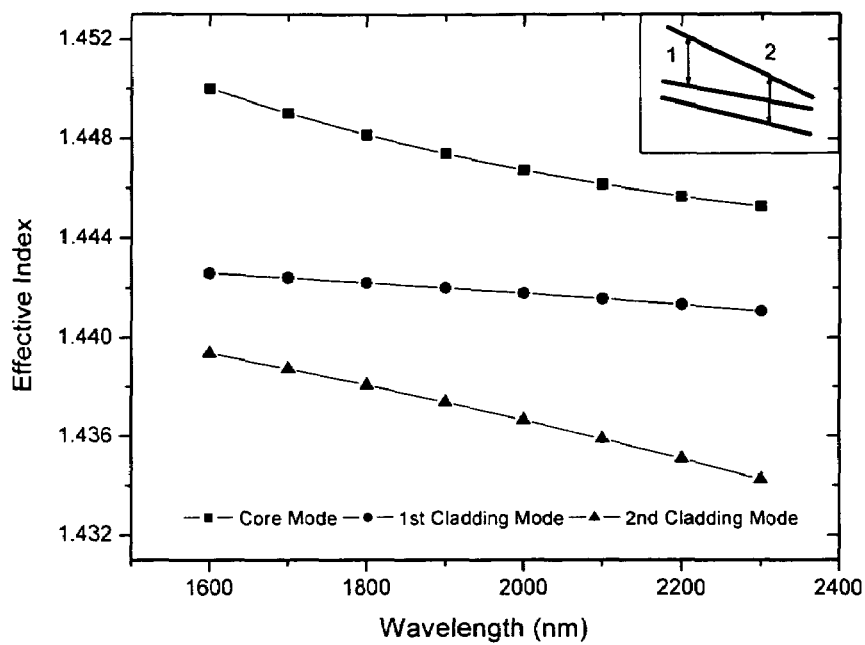
FIG. 3 shows the calculated effective index of the core mode and $1^{st}$, $2^{nd}$ cladding mode for the high NA fiber.

The FSR of the FAOTF is limited by the fact that the core mode can be simultaneously coupled into multiple cladding modes with different resonant wavelengths by the same acoustic wave. The wavelength spacing for these multiple filtering peaks is generally small. For example, the FAOTF demonstrated by B. Y. Kim et al. in U.S. Pat. No. 6,021,237 shows an FSR of <50 nm, which is limited by the wavelength spacing between $1^{st}$ and $2^{nd}$ cladding mode coupling. In the current embodiment, the FSR is increased by fiber etching and dispersion engineering techniques. The mechanism of the approach is illustrated in FIG. 3, which shows the effective index of the core mode and $1^{st}$, $2^{nd}$ cladding mode of the high NA fiber calculated based on its parameters. Acousto-optic mode coupling happens only when the beat length of the core and cladding mode (determined by their effective index difference) matches with the acoustic wavelength. For standard communication fiber, multiple cladding mode coupling may happen as the dispersion (the variation of effective index vs. wavelength) of the core mode is much larger than that of the cladding modes. This phenomenon is illustrated in the inset of FIG. 3, where the $1^{st}$ cladding mode and $2^{nd}$ cladding coupling happen simultaneously at wavelength 1 and 2 as they have the same beat length (effective index difference). For the etched high NA fiber, the dispersion of the $2^{nd}$ cladding mode almost matches with the dispersion of the core mode. This means the beat length for $1^{st}$ cladding mode coupling never matches with the beat length for $2^{nd}$ cladding mode coupling in the 700 nm wavelength range. As a result, only one AO filtering peak will be observed.

Figure 4:
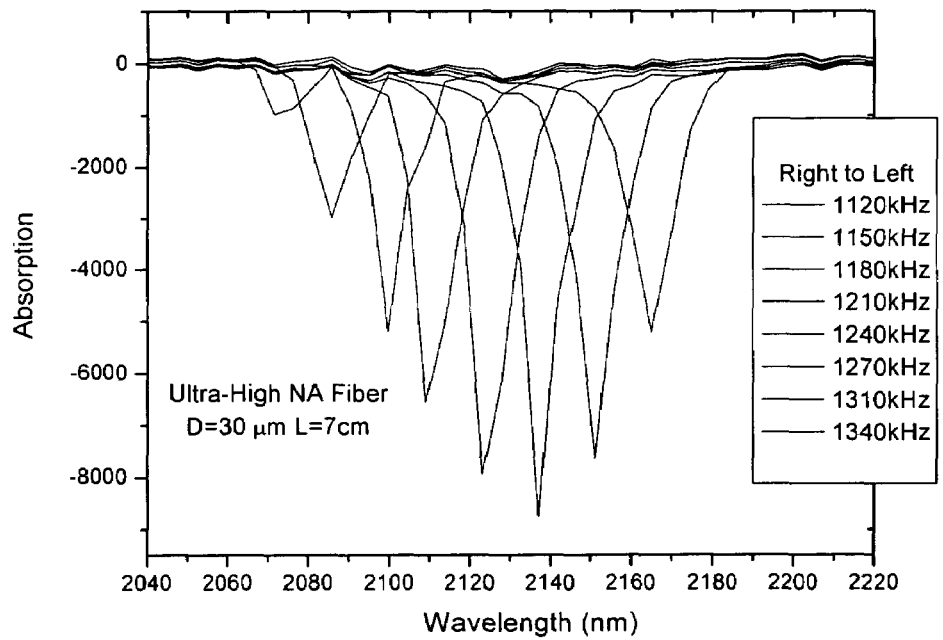
FIG. 4 shows the measured filtering spectra of the FAOTF at different acoustic frequencies by a 2150 nm SLD and a PbS array spectrometer.
Figure 5:
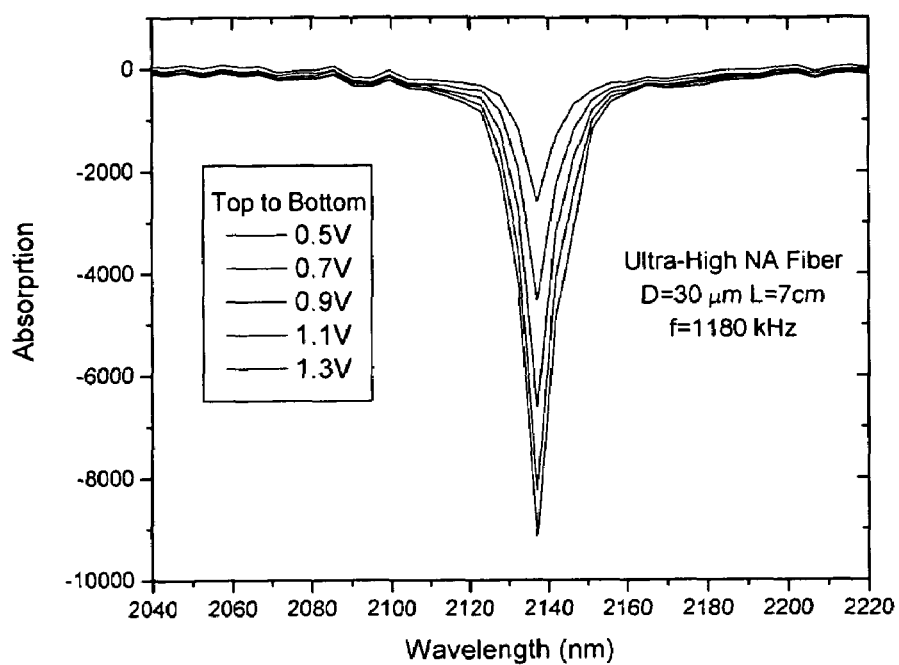
FIG. 5 shows the variation of FAOTF spectra vs. acoustic amplitude at an acoustic frequency of 1180 kHz.
Figure 6:
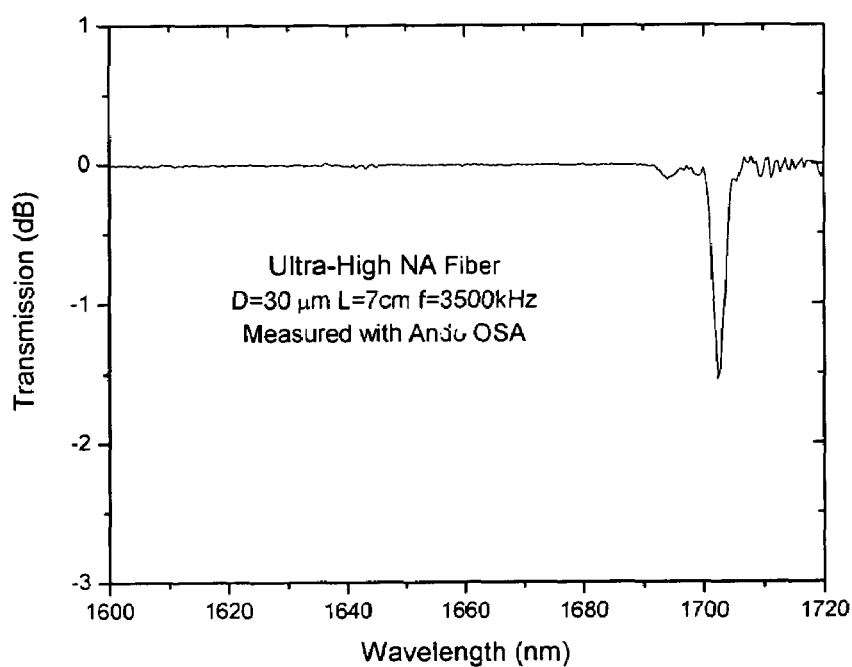
FIG. 6 shows the measured FAOTF spectrum at an acoustic frequency of 3500 kHz by a 1620 nm SLD and an Ando AQ6317B optical spectrum analyzer.

The performance of the FAOTF is first tested by a 2150 nm broadband SLD light source and a PbS array spectrometer. The SLD has a bandwidth of 150 nm. The wavelength resolution of the PbS array spectrometer is 15 nm. FIG. 4 shows the measured filtering spectra of the FAOTF at different acoustic frequencies. The peak attenuation of the FAOTF is set at 10 dB, i.e. 90% of the core mode energy is coupled out into cladding mode at the central wavelength. The central wavelength of the FAOTF can be tuned from 2050 nm to 2200 nm over the entire bandwidth of the SLD. The absorbed power (cladding mode power) is proportional to the spectral intensity of the SLD at FAOTF central wavelength. The calculated FAOTF bandwidth is <5.5 nm at 2100 nm. The wavelength resolution of the PbS array spectrometer is not high enough to measure the exact bandwidth of the FAOTF. FIG. 5 shows the variation of FAOTF spectra vs. acoustic amplitude, which is controlled by adjusting the voltage applied on the PZT. The acoustic frequency is set at 1180 kHz. A 1620 nm broadband SLD with bandwidth of 100 nm and an Ando AQ6317B optical spectrum analyzer (OSA) is used to further characterize the wavelength tuning capability and bandwidth of the FAOTF. The OSA is set to a wavelength resolution of 0.5 nm. The measured FAOTF spectrum at acoustic frequency of 3500 kHz is shown in FIG. 6. It can be seen that the FAOTF has a FWHM bandwidth of <3 nm at 1700 nm wavelength region. By adjusting the acoustic frequency from 1050 kHz to 3500 kHz, the central wavelength of the FAOTF is tuned from 2200 nm to 1700 nm.

Figure 7:
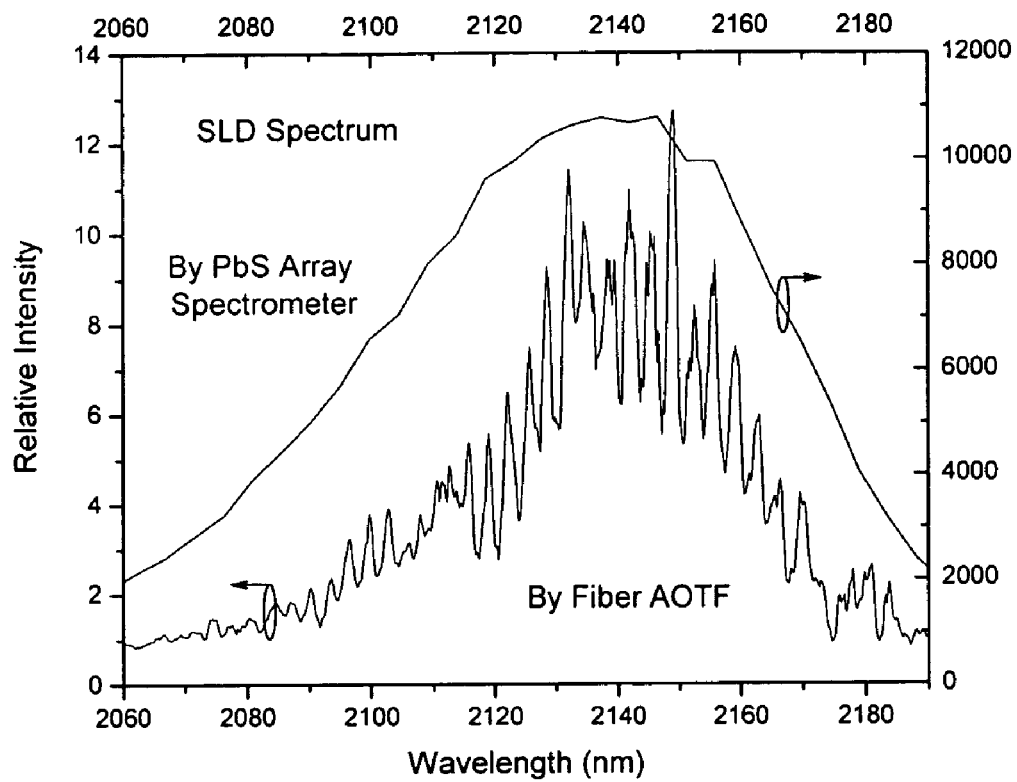
FIG. 7 shows the spectra of a SLD light source measured by the FAOTF spectrometer and the PbS array spectrometer.

The output spectrum of a 'non-perfect' 2100 nm SLD light source is used to characterize the performance of the FAOTF as a spectrometer. The SLD spectra measured by the FAOTF spectrometer and the PbS array spectrometer are shown in FIG. 7. Due to residual F-P (Fabry-Perot) cavity effect, the output spectrum of the SLD is composed of multiple peaks with wavelength spacing of about 3 nm. The PbS spectrometer is incapable of resolving these peaks. Thus it only shows the envelop of the SLD spectrum. The SLD spectrum measured by FAOTF is obtained by scanning the central wavelength of the FAOTF at a wavelength step of 0.2 nm. It clearly shows the fine structure of the SLD spectrum, which verifies the narrow bandwidth of the FAOTF.

Figure 8:
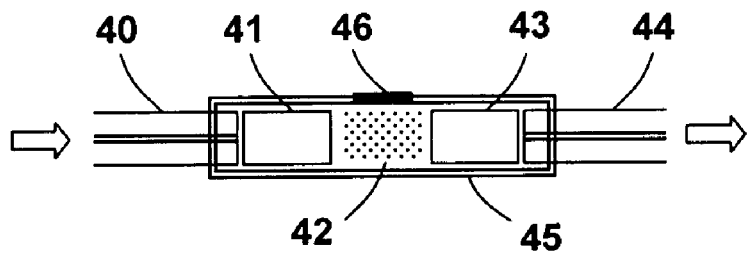
FIG. 8 shows the sensor head design for the exemplary embodiment of the spectroscopic sensor.

The sensor head design for the current embodiment of the spectroscopic sensor is shown in FIG. 8. The optical signal from the broadband light source is transmitted via single-mode fiber pigtail 40 to a self-focus micro-lens 41. The output optical beam is collimated by the self-focus micro-lens 41 and transmits through the sample 42. The transmitted optical signal, which contains spectral information of the sample, is collected by another self-focus micro-lens 43 and coupled into single-mode fiber pigtail 44 to be analyzed by the FAOTF spectrometer. In this embodiment, the self-focus micro-lenses 41, 43 have NA of 0.46, outer diameter of 1.8 mm, and pitch width of 0.23 mm. The self-focus micro-lenses 41, 43, the sample 42, and part of the fiber pigtail 40, 44 are encapsulated in a cylindrical shaped holder 45 with inner diameter of 3.16 mm. There is a hole 46 on top of the holder 45 for sample injection. The distance between the two self-focus micro-lenses 41, 43 can be adjusted from 0.5 mm to 2 mm to adapt for samples with different absorption coefficients. The required sample volume for this sensor head is on the order of several micro-liters.

Figure 9:
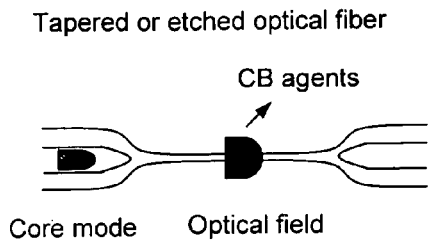
FIGS. 9(*a*) and (*b*) show other possible forms of optical sensor head design.
Figure 9:
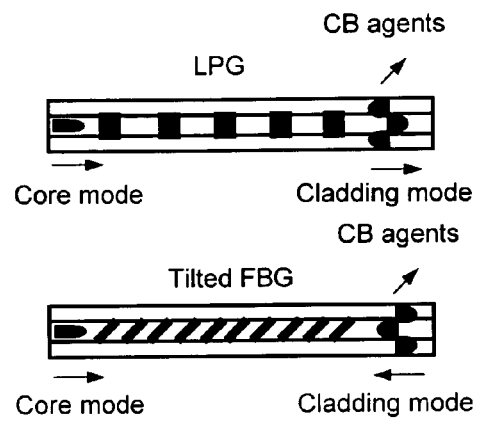

Depending on the requirement for different applications, the sensor head can take other forms, as shown in FIGS. 9(a) and (b). In FIG. 9(a), a section of the fiber is stripped and tapered or deeply etched to expose the evanescent field of the optical mode to the sample. The sample interacts with the optical mode through the evanescent field and produces similar absorption spectrum as in FIG. 8. In FIG. 9 (b), the optical signal is first coupled out from core mode into cladding mode using a fiber-grating device (either long-period grating (LPG) or tilted fiber Bragg grating (FBG)). The sample then interacts with the optical field through the cladding mode.

Figure 10:
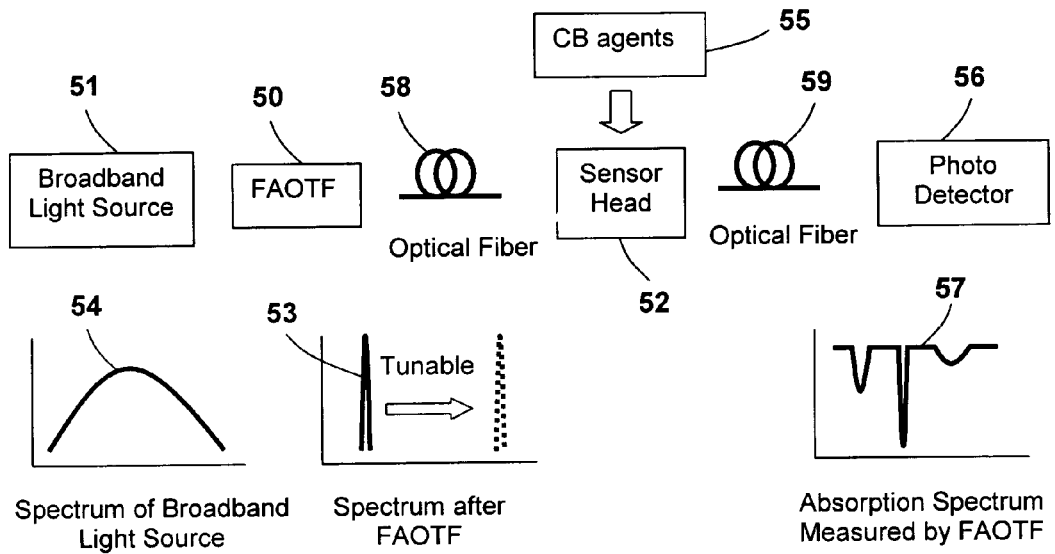
FIG. 10 shows another variation of the spectroscopic sensor in which the FAOTF is used as a wavelength-selection filter or monochromer.

Another variation of the absorption spectroscopic sensor is shown in FIG. 10. In this scheme, the FAOTF 50 is placed between the broadband light source 51 and the optical sensor head 52 and serves as a wavelength-selection filter or monochromater. A wavelength component 53 of the broadband spectrum 54 is selected by the FAOTF 50 and delivered to the CB agent sample 55. The absorption of the CB agent sample 55 at the specific wavelength is measured by a photo detector 56. The wavelength of the FAOTF is then continuously scanned by adjusting the acoustic frequency to obtain the whole absorption spectrum 57. The broadband light source 51, the sensor head 52, and the FAOTF 50 is connected by optical fibers 58, 59.

Figure 11:
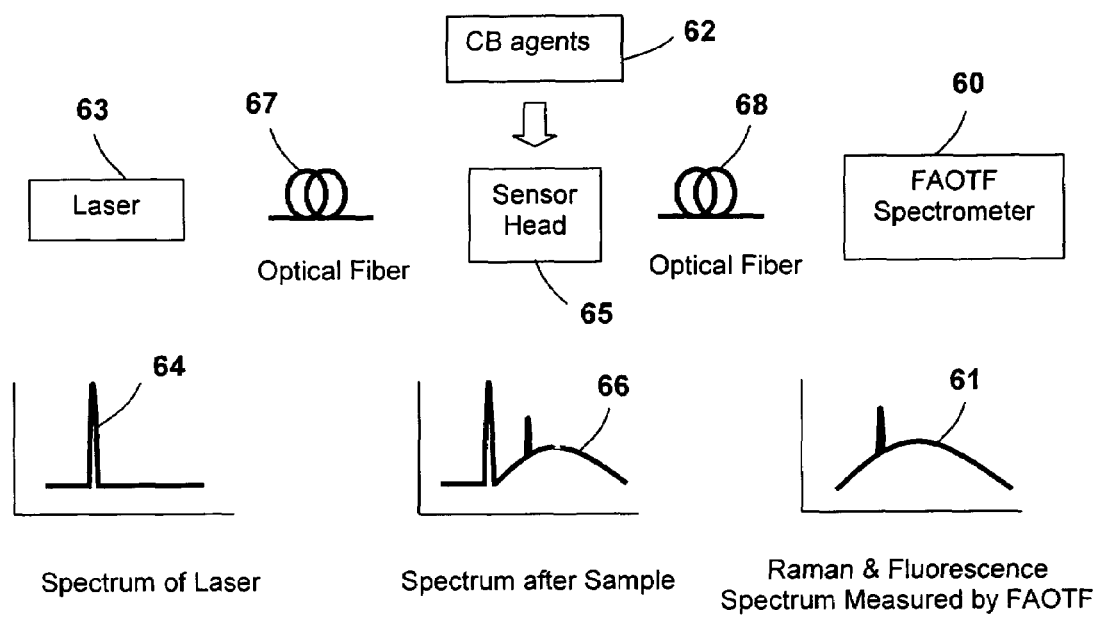
FIG. 11 shows another variation of the spectroscopic sensor in which the fluorescence and/or Raman emission spectrum of the sample is measured.

In another variation of the spectroscopic sensor as shown in FIG. 11, the FAOTF 60 is configured to measure the fluorescence and/or Raman emission spectrum 61 of the CB agent sample 62. A laser 63, which can be a semiconductor laser diode (LD), a solid state laser, a gas laser or other kind of lasers, is used instead of the broadband light source to produce a light with narrow bandwidth spectrum 64. When the laser light interacts with the sample 62 through the sensor head 65, a fluorescence and/or Raman emission 66 that carries the constitutional information of the CB agents 62 is generated. The fluorescence and/or Raman emission 66 is then analyzed by the FAOTF 60 to determine the content and concentration of the sample 62. The laser 63, the sensor head 65, and the FAOTF 60 is connected by optical fibers 67, 68.

While various exemplary embodiments of the current invention have been set forth above, those skilled in the art who have reviewed the present disclosure will readily appreciate that other embodiments can be realized within the scope of the present invention. For example, the FAOTF may operate in other wavelength regimes. The fiber used can be single-mode fiber (SMF), two-mode fiber (TMF), multi-mode fiber (MMF) or even tapered fiber and newly developed photonic crystal fiber (PCF). The index profile of the fiber can be step index, graded index or other complex index profiles that optimized to achieve the best FAOTF filtering property. The fiber can be made of other materials such as fluoride glass that has high transmission at infrared wavelengths. Therefore, the present invention should be construed as limited only by the appended claims.

We claim:

1. An all-fiber spectroscopic optical sensor for analyzing a sample, the sensor comprising:
   a. a light source for producing an optical signal;
   b. a sensor head where the optical signal interacts with the sample to produce an output spectrum;
   c. a fiber acousto-optic tunable filter (FAOTF), in a path of the output spectrum, for selecting wavelength components from the output spectrum; and
   d. one or more photo detectors for measuring said wavelength components.

2. The spectroscopic sensor of claim 1, further comprising optical fibers for interconnecting the light source, the sensor head, and the FAOTF for optical signal delivery.

3. The spectroscopic sensor of claim 1, wherein the light source is a broadband light source.

4. The spectroscopic sensor of claim 3, wherein the broadband light source comprises a light emitting diode, a superluminescence diode, a supercontinuum light source, or a lamp.

5. The spectroscopic sensor of claim 3, wherein the output spectrum from the sample is an absorption, transmission, reflection and/or scattering spectrum.

6. The spectroscopic sensor of claim 1, wherein the light source is a narrowband light source, 7. The spectroscopic sensor of claim 6, wherein the narrowband light source comprises a laser or a filtered narrow bandwidth light source.

8. The spectroscopic sensor of claim 6, wherein the output spectrum from the sample is an emission spectrum for fluorescence spectroscopy, Raman spectroscopy, and/or laser-induced breakdown spectroscopy.

9. The spectroscopic sensor of claim 1, wherein the sensor head comprises a first collimating optical element, a second collimating optical element, and a sample holder, and wherein the optical beam from the light source is first collimated by the first collimating element and then delivered to the sample, and wherein the optical beam transmitted or emitted from the sample is collected by the second collimating element.

10. The spectroscopic sensor of claim 1, wherein the sensor head comprises a section of tapered or deeply etched optical fiber, and wherein the sample interacts with the optical signal through evanescent field coupling.

11. The spectroscopic sensor of claim 1, wherein the sensor head comprises a fiber long-period grating or tilted fiber Bragg grating, and wherein the sample interacts with the optical signal through the cladding mode.

12. The spectroscopic sensor of claim 1, wherein the FAOTF operates in a wavelength regime from UV/visible to infrared.

13. The spectroscopic sensor of claim 1, wherein the FAOTF is built on single mode fiber, two-mode fiber, multi-mode fiber, tapered fiber or photonic crystal fiber.

14. The spectroscopic sensor of claim 13, wherein the FAOTF has a wavelength tuning range greater than 500 nm.

15. The spectroscopic sensor of claim 14, wherein the FAOTF has only one filtering peak in the wavelength tuning range.

16. The spectroscopic sensor of claim 14, wherein the FAOTF has a bandwidth less than 5.5 nm.

17. The spectroscopic sensor of claim 13, wherein the photo detector is put at the end of the fiber to detect core mode power.

18. The spectroscopic sensor of claim 13, wherein the photo detector is attached on side of the fiber to detect higher order mode or cladding mode.

19. An all-fiber spectroscopic optical sensor for analyzing a sample, comprising:
  a. a light source for producing a broadband optical signal;
  b. a fiber acousto-optic tunable filter (FAOTF) for selecting wavelength components from the broadband optical signal;
  c. a sensor head where the selected wavelength components of the optical signal interacts with the sample to produce an output optical signal; and
  d. one or more photo detectors for measuring said output optical signal.

* * * * *